United States Patent
Sawaf et al.

(10) Patent No.: US 11,734,492 B2
(45) Date of Patent: Aug. 22, 2023

(54) MANIPULATING DIACRITIC MARKS

(71) Applicant: Saudi Arabian Oil Company, Dhahran (SA)

(72) Inventors: Khaled Sawaf, New York, NY (US); Sheikah Alshaihah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/589,397

(22) Filed: Jan. 31, 2022

(65) Prior Publication Data

US 2022/0284170 A1 Sep. 8, 2022

Related U.S. Application Data

(60) Provisional application No. 63/157,115, filed on Mar. 5, 2021.

(51) Int. Cl.
| | |
|---|---|
| *G06F 3/048* | (2013.01) |
| *G06F 40/109* | (2020.01) |
| *G06F 3/0484* | (2022.01) |
| *G06F 3/0482* | (2013.01) |

(52) U.S. Cl.
CPC .......... *G06F 40/109* (2020.01); *G06F 3/0482* (2013.01); *G06F 3/0484* (2013.01)

(58) Field of Classification Search
CPC .............................. G06F 3/0482; G06F 3/0484
See application file for complete search history.

(56) References Cited

U.S. PATENT DOCUMENTS

| | | | |
|---|---|---|---|
| 4,603,330 A | 7/1986 | Horne | |
| 5,182,709 A | 1/1993 | Makus | |
| 5,416,898 A | 5/1995 | Opstad | |
| 5,586,241 A | * 12/1996 | Bauermeister | ........ G06T 11/203 345/170 |
| 6,882,344 B1 | 4/2005 | Hayes et al. | |
| 7,453,439 B1 | 11/2008 | Kushler | |
| 7,991,153 B1 | 8/2011 | Rao et al. | |

(Continued)

OTHER PUBLICATIONS

"DCODE: Diacritics Obfuscation," retrieved from URL <https://www.dcode.fr/diacritics-obfuscation>, 2020, 2 pages.

(Continued)

*Primary Examiner* — Claudia Dragoescu
(74) *Attorney, Agent, or Firm* — Fish & Richardson P.C.

(57) ABSTRACT

Disclosed are methods, systems, and computer-readable medium to perform operations including: generating a plurality of letter glyphs of a language that includes diacritic marks; generating a plurality of diacritic glyphs of the diacritic marks; anchoring the plurality of diacritic glyphs to the plurality of character glyphs to create a set of character glyphs; creating, using the set of character glyphs, a duplicate set of character glyphs comprising a plurality of duplicate letter glyphs and a plurality of duplicate diacritic glyphs; editing the plurality of duplicate diacritic glyphs to change a visual property of the plurality of duplicate diacritic glyphs; designating the set of character glyphs as a first variable font and the duplicate set of character glyphs as a second variable font; compiling the first and second variable fonts into a master font; and providing the master font for output on a graphical user interface (GUI).

19 Claims, 9 Drawing Sheets

(56) References Cited

U.S. PATENT DOCUMENTS

| | | | |
|---|---|---|---|
| 8,429,397 | B2 | 4/2013 | Imai |
| 8,543,382 | B2 | 9/2013 | Khorsheed |
| 8,726,148 | B1 | 5/2014 | Battilana |
| 8,902,170 | B2 | 12/2014 | Pasquero et al. |
| 9,298,277 | B1 | 3/2016 | Alsabah |
| 9,436,291 | B2 | 9/2016 | Khan |
| 9,529,449 | B1 | 12/2016 | Chen |
| 9,619,435 | B2 | 4/2017 | Wendt |
| 9,846,684 | B2 | 12/2017 | Beaver et al. |
| 10,019,415 | B1 | 7/2018 | Wombell |
| 10,234,958 | B2 | 3/2019 | Chen |
| 11,210,450 | B1* | 12/2021 | Dhanuka ............... G06T 11/203 |
| 2004/0257301 | A1 | 12/2004 | Ari |
| 2006/0100848 | A1 | 5/2006 | Cozzi |
| 2006/0132812 | A1 | 6/2006 | Barnes |
| 2007/0040813 | A1 | 2/2007 | Kushler |
| 2007/0262991 | A1 | 11/2007 | Abulhab |
| 2008/0030502 | A1* | 2/2008 | Chapman ........... G06K 15/1835 345/472.3 |
| 2008/0276166 | A1 | 11/2008 | Wang-Aryattanwanich |
| 2008/0300861 | A1 | 12/2008 | Emam |
| 2008/0301431 | A1 | 12/2008 | Hea |
| 2012/0109633 | A1 | 5/2012 | Khorsheed |
| 2013/0271382 | A1 | 10/2013 | Khan |
| 2014/0115452 | A1 | 4/2014 | Rudolph |
| 2014/0237241 | A1 | 8/2014 | Kurosawa et al. |
| 2014/0380169 | A1 | 12/2014 | Eldawy |
| 2015/0149895 | A1* | 5/2015 | Furman ................ G06F 40/109 715/269 |
| 2017/0010860 | A1 | 1/2017 | Henniger |
| 2017/0017854 | A1 | 1/2017 | You |
| 2017/0102780 | A1 | 4/2017 | Chen |
| 2020/0097525 | A1* | 3/2020 | Dhanuka ............. G06F 16/5838 |

OTHER PUBLICATIONS

Baawi et al. "Improvement of 'Text Steganography Based on Unicode of Characters in Multilingual' by Custom Font with Special Properties," 2020 IOP Conference Series: Materials Science and Engineering, 870:012125, 2020, 12 pages.

Blatner, "Scramble Text in Place to Hide Private Info," retrieved from URL <http://indesignsecrets.com/scramble-text-place-hide-private-info.php>, Nov. 11, 2014, 8 pages.

designwithfontforge.com [online], "Design With FontForge: A Book About How To Create New Typefaces Using FontForge," Sep. 28, 2020, retrieved from URL < http://designwithfontforge.conn/en-US/Diacritics and Accents.html>, available via internet archive URL <https://web.archive.org/web/20200628033344/http://designwithfontforge.conn/en-US/Diacritics and Accents.html>, 2020, 9 pages.

Gutub et al., "Utilizing Diacritic Marks for Arabic Text Steganography," Kuwait Journal of Science & Engineering 2020, 37:1 (89-109), 11 pages.

Gutub et al., "Utilizing Diacritic Marks for Arabic Text Steganography," Kuwait Journal of Science & Engineering, Jun. 2010, 37(1):89-109.

Hssini et al., "Design of Arabic Diacritical Marks," IJCSI International Journal of Computer Science Issues, May 2011, 8(3).

Maannouri et al., "Developing ARET: an NLP-based educational tool set for Arabic reading enhancement," the 7th Workshop on the Innovative Use of NLP for Building Education Applications, Jun. 3-8, 2012, 127-135, 9 pages.

robofont.com [online], "Documentation: Introduction to accented glyphs," available on or before Feb. 6, 2020, retrieved from URL <https://robofont.conn/docunnentation/how-tos/introduction-to-accented-glyphs/>, available from internet archive, <https://web.archive.org/web/20200921183156/https://robofont.conn/docunnentation/how-tos/introduction-to-accented-glyphs/>, 2020, 3 pages.

support.apple.com, "Font Book User Guide," available on or before Oct. 29, 2021, <https://support.apple.com/lv-Iv/guide/font-book/fntbk1001/mac>, 3 pages.

textmechanic.com [online], "Word Scrambler/Descrambler," retrieved from URL <http://textmechanic.com/text-tools/obfuscation-tools/word-scramblerunscrambler/>, retrieved on Sep. 21, 2020, available on or before 2015, 2 pages.

w3.org [online], "G163: Using standard diacritical marks that can be turned off," available on or before Jul. 20, 2017, retrieved from URL <https://www.w3.org/TR/2008/NOTE-WCAG20-TECHS-20081211/G163>, available from internet archive URL <https://web.archive.org/web/20170720050654/https://www.w3.org/TR/2008/NOTE-WCAG20-TECHS-20081211/G163>, 2017, 2 pages.

wikipedia.org, "Windows Glyph List 4," available on or before Oct. 29, 2021, retrieved from URL <https://en.wikipedia.org/wiki/Windows_Glyph_List_4>, 5 pages.

* cited by examiner

MANIPULATING DIACRITIC MARKS

CROSS-REFERENCE TO RELATED APPLICATIONS

This application claims priority to U.S. Provisional Patent Application No. 63/157,115 filed Mar. 5, 2021, entitled "MANIPULATING DIACRITIC MARKS," the entirety of which is incorporated herein by reference.

TECHNICAL FIELD

This disclosure relates to methods and systems for manipulating visual appearance properties of diacritic marks of a text during typesetting for print or digital publishing.

BACKGROUND

The writing systems of some languages use diacritic marks (also referred to as diacritics) that can be added to the letters of the languages, such as accent marks above or below the letters. Diacritic marks that are anchored to letters (referred to as base letters) serve different functions, such as vowel pointing (for example, in Arabic and Hebrew) and changing the sound-values of the base letters (for example, in Latin script).

SUMMARY

In computer software, such as software text editors, the visual properties of diacritic marks of a font are fixed and predetermined by design. Thus, a software user or typesetting designer is not afforded any control over the visual properties of the diacritic marks, such as orientation, proximity position, shape, or form. This is particularly undesirable in scenarios where the diacritic marks cause the text to be illegible, such as when the diacritic marks are too large or too small. For example, fonts containing languages that require elaborate or stacked diacritic marks cause readability problems in multiline texts due to the diacritic marks overlapping other diacritics or characters. The resulting appearance is undesirable for functional and coherent design. Additionally, the resulting appearance is detrimental to legibility and adds linguistic ambiguity. Currently, in order to avoid these undesirable results, a software user is compelled to artificially add additional interline space (leading). However, this solution is inelegant and restricts design choices.

This disclosure describes methods and systems that provide a software user or typesetting designer controls for customizing or adjusting the appearance properties of diacritic marks. These controls, which allow for incremental changes and detailed adjustments, are encoded or embedded in the font software as part of the font development and type design processes. In one embodiment, the controls are implemented and delivered within a given font file and are accessible by an end user through the use of the font in their software environment.

Innovative aspects of the subject matter described in this disclosure may be embodied in methods that include the actions of: generating a plurality of letter glyphs of a language that includes diacritic marks; generating a plurality of diacritic glyphs of the diacritic marks; anchoring the plurality of diacritic glyphs to the plurality of character glyphs to create a set of character glyphs for the language; creating, based on the set of character glyphs, a duplicate set of character glyphs comprising a plurality of duplicate letter glyphs and a plurality of duplicate diacritic glyphs; editing the plurality of duplicate diacritic glyphs to change a visual property of the plurality of duplicate diacritic glyphs; designating the set of character glyphs as a first variable font and the duplicate set of character glyphs as a second variable font; compiling the first variable font and the second variable font into a master font; and providing the master font for output on a graphical user interface (GUI) displayed on a display device.

Other embodiments of these aspects include corresponding systems, apparatus, and computer programs, configured to perform the actions of the methods, encoded on computer storage devices. These and other embodiments may each optionally include one or more of the following features.

In some implementations, the method further involves generating a plurality of font weight styles for the master font; and providing the plurality of font weight styles for output on the GUI.

In some implementations, the method further involves coding respective names for each of the first variable font and the second variable font, wherein the respective name of the second variable font is based on the changed visual property.

In some implementations, the GUI includes a font menu that includes the respective names of the first variable font and the second variable font.

In some implementations, the method further involves receiving a user input indicating selection of one of the first variable font and the second variable font for a text that includes diacritic marks, wherein the text is displayed on the GUI.

In some implementations, editing the plurality of duplicate diacritic glyphs to change a visual property involves editing code of source files of the plurality of duplicate diacritic glyphs to change a value of the visual property.

In some implementations, the visual property is one of a visual scale, Y- or vertical-position with respect to a base letter, X- or horizontal-position with respect to the base letter, angle tilt, or weight of the plurality of duplicate diacritic glyphs.

The subject matter described in this specification can be implemented to realize one or more of the following advantages. The disclosed systems enable base letter independent diacritic control or manipulation. In particular, the disclosed systems provide software users or typesetting designers with controls to customize orientation, position, shape, or form of diacritics independently from the design of the base letters. Thus, the disclosed systems help avoid scenarios in which diacritics cause illegibility or readability issues in a printed or displayed text.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes a font system that provides a software user or typesetting designer controls for customizing or controlling diacritic appearance properties. In one embodiment, the font system develops a font that has variable diacritic visual properties. The font system provides the generated font for use in computer software, such as a text editing software. Selection of the font for a text allows a user to modify at least one visual property of the diacritic marks in the text (without also modifying the properties of the associated base letters). For example, a size of the diacritic marks can be controlled to be larger than or smaller than a baseline size. In this example, although the size of the diacritic marks is modified, the size of the base letters remains the same. Although the examples in this disclosure use Arabic text, the disclosed systems and methods can be applied to any language that uses diacritic marks, such as Hebrew and Latin.

Figure 1:
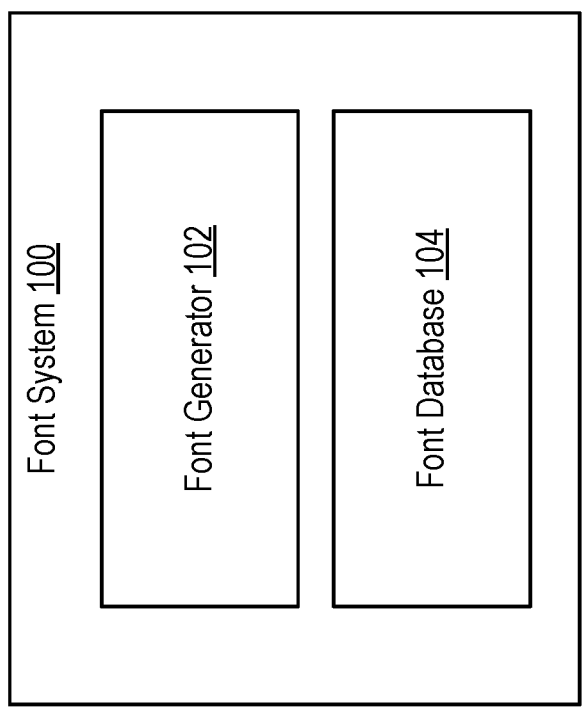
FIG. 1 illustrates a block diagram of an example font system, according to some implementations of the present disclosure.

FIG. 1 illustrates an example block diagram of a font system 100, according to some embodiments. As described below, the font system 100 enables users of computer software to control or manipulate visual properties of diacritic marks in a text. In one embodiment, the font system 100 is implemented by a computing system, such as computer system 600 of FIG. 6 (described in more detail below). Note that the font system 100 is shown for illustration purposes only, as the font system 100 may include additional components or have one or more components removed without departing from the scope of the disclosure. Further, note that the various components of the font system 100 can be arranged or connected in any manner.

As shown in FIG. 1, the font system 100 includes a font generator 102 and a font database 104. The font generator 102 is configured to generate and store one or more fonts in a memory of the font database 104. More specifically, the font generator 102 is configured to generate variable fonts that have variable visual appearance properties for diacritic marks. The font system 100 provides the variable fonts for use in computer-based software. When used in computer-based software, the variable fonts enable modification of at least one visual property of the diacritic marks in a text (without also modifying the properties of the base letters in the text).

In some embodiments, the font generator 102 includes a programming tool that is used to generate variable fonts. To create a variable font, the programming tool generates a plurality variable font formats. Each variable font format is associated with a respective visual appearance property of the variable font. Specifically, each variable font format is associated with a range of values that represent the respective visual appearance property. As an illustrative example, a variable font format can be associated with a range of typeface weight values that represent a font typeface weight (for example, a heavyset typeface or a light typeface).

In some embodiments, more than one variable font format can be associated with the same visual appearance property, for example, where each variable font represents a different range of values of the variable visual appearance property. In the example of typeface weight, a first variable font format can be associated with a first range of typeface weight values representing a bold or heavyset typeface, a second variable font format can be associated with a second range of font weight values representing a light typeface, and a third variable font format can be associated with a third range of font weight values between the bold and the light ranges of values.

In some embodiments, the range of values for a particular property is on a 100 point scale. In these embodiments, the one or more variable font formats can be associated with respective ranges on the 100 point scale. Returning to the example of typeface weights, the first master font can be associated with values between 70 and 100 (that is, values that represent a bold or heavyset typeface), the second master font can be associated with values between 0 and 30 (that is, values that represent a light typeface), and the third master font can be associated with values between 30 and 70 (that is, values that represent a median typeface between the bold typeface and the light typeface).

Once the variable font formats are generated, the programming tool compiles the variable font formats into the variable font (also referred to as a "master font"). Once compiled, each variable font format serves as an axis of the variable font. Thus, a visual appearance property can be controlled by selecting a value along an axis of the visual appearance property. This mechanism allows the variable font to control the visual appearance properties of a text, for example, that is displayed on a graphical user interface. As an example, a variable font can include a typeface weight axis and an italics axis, which can be used to control the typeface weight and italics of the font, respectively.

In some embodiments, the font generator 102 uses the programming tool to generate a variable font for controlling visual appearance properties of diacritics. As described in more detail below, the variable font includes variable font formats for one or more of the following diacritic visual appearance properties: visual scale (that is, diacritics size), Y- or vertical-position (with respect to a base letter), X- or horizontal-position (with respect to a base letter), orientation (for example, angle tilt with respect to a default angle), and typeface weight. The variable font formats are compiled into a master font that can be used to control the diacritic visual appearance properties of a text. In an example, the font generator 102 uses workflow 200 of FIG. 2 to generate the variable font.

Figure 2:
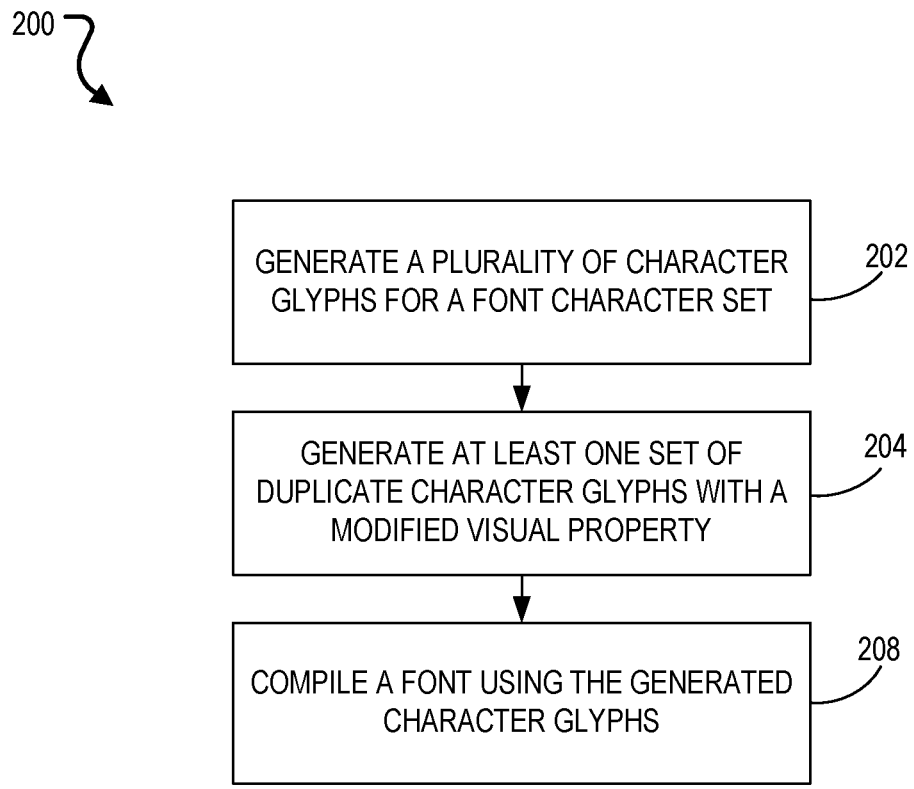
FIG. 2 illustrates an example workflow for generating a font for manipulating diacritic marks, according to some implementations of the present disclosure.

FIG. 2 illustrates an example workflow 200 for generating a variable font for manipulating diacritic marks, according to some embodiments. For clarity of presentation, the description that follows describes the workflow 200 in the context of components in other figures of this disclosure. For example, the workflow 200 is described as being performed by the font generator 102 of FIG. 1. However, it will be understood that the workflow 200 can additionally or alternatively be performed by any suitable system, environment, software, hardware, or a combination of systems, environments, software, and hardware, as appropriate. Additionally, various steps of the workflow 200 can run in parallel, in combination, in loops, or in any order.

As shown in FIG. 2, the workflow 200 starts at step 202. At this step, the font generator 102 generates a plurality of character glyphs for a character set of a language that uses diacritic marks. The character glyphs include (i) letter glyphs of the language's letters and (ii) diacritic glyphs of the language's diacritic marks. The plurality of character glyphs can be generated using a computer software glyph generator. Additionally or alternatively, the plurality of character glyphs can be generated based on a user input indicative of user-generated designs. When the font generator 102 generates the diacritic glyphs, it assigns the glyphs default or baseline visual appearance properties. In one example, the default visual properties are represented by numerical values (for example, integer ranges or percentages). The visual properties include visual scale (size), Y- or vertical-position (with respect to a base letter), X- or horizontal-position (with respect to a base letter), orientation (for example, angle tilt with respect to a normal or default angle), and typeface weight. The default visual properties can be selected by the glyph generator or can be specified by user input.

Once the plurality of character glyphs are generated, the font generator 102 anchors the diacritic glyphs to the letter glyphs. To do so, the font generator 102 associates the diacritic glyphs with the letter glyphs in design and code according to the language's grammatical rules. For example, in languages where any diacritic mark can be applied to any letter, such as Arabic, each diacritic mark glyph is associated with each letter glyph. Other examples are possible.

At step 204, the font generator 102 generates one or more sets of duplicate diacritic glyphs, each of which is generated with a modified visual appearance property compared to the baseline visual appearance properties. As an example, the font generator 102 generates a set of duplicate diacritic glyphs that have a size that is larger than (or smaller than) a baseline size. The value that represents the modified visual property can be based on user input or can be based on a predetermined incremental value from the baseline value (for example, 10% greater than the baseline value). Within examples, the modified visual property can be visual scale (size), Y- or vertical-position (with respect to a base letter), X- or horizontal-position (with respect to a base letter), orientation (for example, angle tilt with respect to a normal or default angle), and typeface weight.

In some embodiments, the font generator 102 generates more than one set of duplicate diacritic glyphs that modify the same diacritic visual appearance property. In these embodiments, the more than one set modify the diacritic visual appearance property with different increments from the baseline value for that diacritic visual appearance property. For example, a first set of duplicate diacritic glyphs is generated to have a size that is larger than or smaller than a baseline size by a first increment, and a second set of duplicate diacritic glyphs is modified to have a size that is larger than or smaller than a baseline size by a second increment. Within examples, any number of sets of duplicate diacritic glyphs can be generated for each of the visual appearance properties. In one example, the sets of duplicate diacritic glyphs include one or more of the following sets:

a duplicate set of diacritic glyphs with a larger visual scale (size) than a baseline size;

a duplicate set of diacritic glyphs with a smaller visual scale (size) than the baseline size;

a duplicate set of diacritic glyphs with a shifted visual Y-position higher than a baseline Y-position with respect to a base letter;

a duplicate set of diacritic glyphs with a shifted visual Y-position lower than a baseline Y-position with respect to a base letter;

a duplicate set of diacritic glyphs with a shifted visual X-position to the left of a baseline X-position;

a duplicate set of diacritic glyphs with a shifted visual X-position to the right of the baseline X-position;

a duplicate set of diacritic glyphs with a modified weight that is greater than a baseline weight;

a duplicate set of diacritic glyphs with a modified weight that is thinner than the baseline weight;

a duplicate set of diacritic glyphs with a smaller angle tilt than a baseline angle tilt; and a duplicate set of diacritic mark glyphs with a larger angle tilt than the baseline angle tilt.

At step 206, the font generator 102 compiles a variable font using the generated sets of character glyphs. In this step, each duplicate diacritic set is assigned to the variable font (the font master). Additionally, each duplicate diacritic set is assigned a custom-named parameter range and increment from the baseline. In some embodiments, the workflow 200 may involve generating a font that has a plurality of font weights. Thus, in addition to selecting the visual properties for the diacritics of the text, a font weight can also be selected for all characters of the text (that is, both diacritic and letter glyphs). Additionally or alternatively, the font software can be used to generate font styles that represent the variable fonts or an interpolation point between them.

In some embodiments, the font generator 102 creates two or more variable fonts that are identical (for example, in weight and design) except that each variable font uses alternate characters. As an example, one variable font includes characters with a standard diacritic anchor position, and the other variable font includes characters that have a diacritic anchor vertical position different from the standard diacritic anchor position. The difference between the two variable fonts is designated as an axis that can be customized. For example, the custom axis can be named "diacritic position," and can be used to control the position of diacritic marks. In particular, the axis can be assigned a range of values (for example, from 0 to 100), where one end of the range matches the standard property and the other end of the spectrum matches the modified property. In the example of diacritic anchor position, the value 0 can represent the standard diacritic anchor position and the value 100 can represent the furthest configured diacritic anchor position from the standard position.

The font generator 102 compiles the font in a variable format. As described in more detail below, the complied font can be associated with a graphical user interface tool that allows the user to control the desired value for the font. For example, a slider titled "diacritic position" shows a range of 0 to 100 that were set for the custom parameter. In some embodiments, the font generator 102 creates custom parameter axis for each property of diacritics, names each custom parameter axis, and assigns it a range of values. As an example, the font generator 102 can create a respective custom parameter axis for one or more of scale (size), Y- or vertical-position (with respect to a base letter), X- or horizontal-position (with respect to a base letter), orientation (for example, angle tilt with respect to a normal or default angle), and typeface weight. In these embodiments, the compiled font includes each of the generated respective custom parameter axes.

Returning to FIG. 1, the font generator 102 stores the generated font in the font database 104. Additionally, the font system 100 can provide the font to a computer system (for example, computer system 600 of FIG. 6). The computing system can then provide information indicative of the font to a user via a user interface. The user can provide a user input indicating selection of the font for a text. The user can then select from the different duplicate sets of diacritic glyphs of the font in order to manipulate the visual properties of the diacritic marks of the text. More specifically, the user can manipulate the shape, orientation, horizontal and vertical position, boldness, and scale of the diacritics independently of their base character glyphs via standard font utilization tools and methods they already use to utilize all other fonts.

Figure 3A:
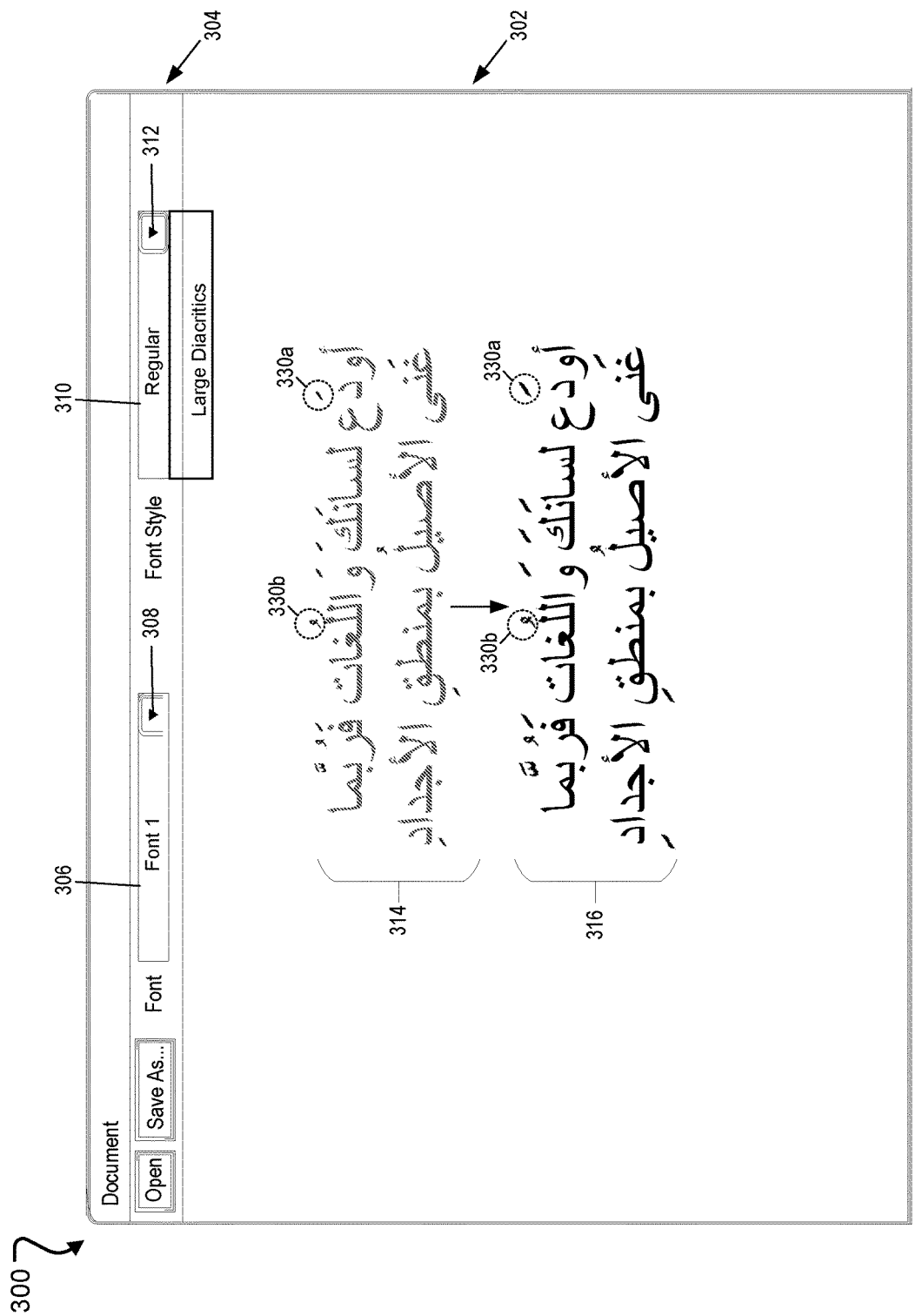
FIG. 3A, FIG. 3B, and FIG. 3C each illustrate an example graphical user interface (GUI) that provides a generated font to users of the interface, according to some implementations of the present disclosure.
Figure 3B:
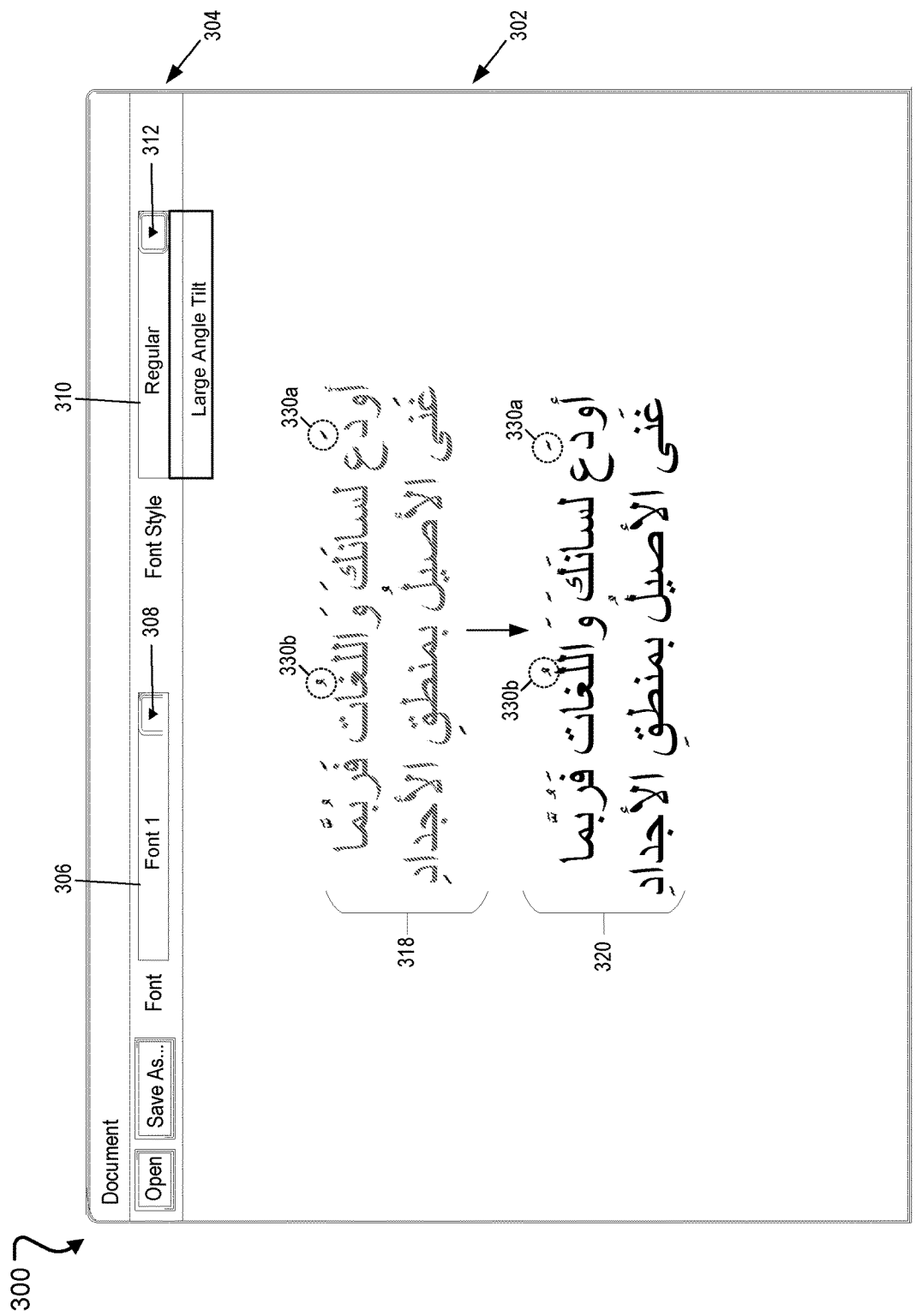
Figure 3C:
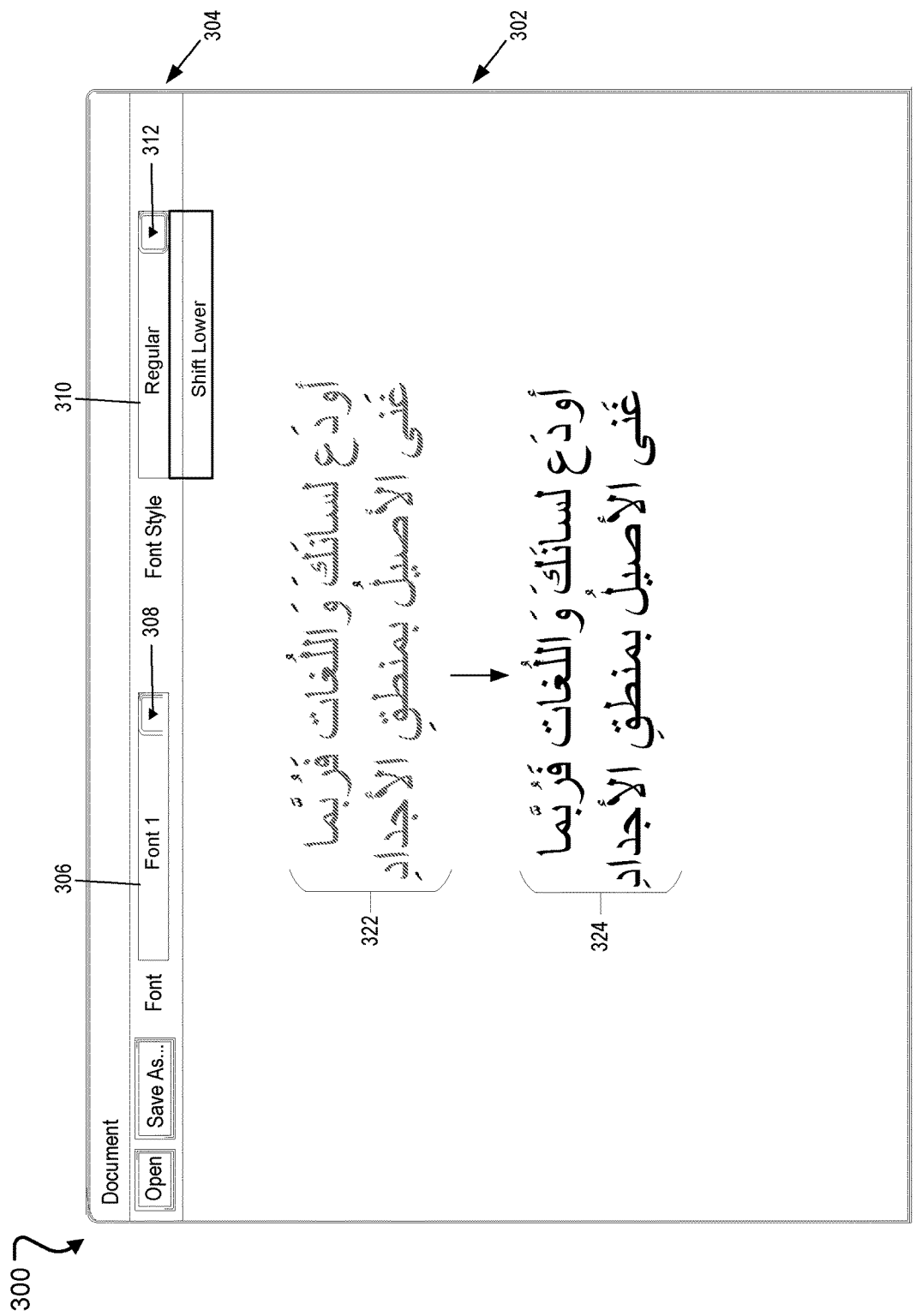

FIG. 3A, FIG. 3B, and FIG. 3C each illustrate an example graphical user interface (GUI) 300 that provides a generated font to users of the interface, according to some implementations. The GUI 300 may be associated with any software application, such as a software text editor. As shown in FIG. 3A, the GUI 300 includes a primary window 302 that displays text and other software elements. Additionally, the GUI 300 includes a toolbar panel 304. The toolbar panel 304 includes drop-down menu 306, which can be accessed by clicking arrow button 308. A font for the text can be selected from the drop-down menu 306. The toolbar panel 304 also includes drop-down menu 310, which can be accessed by clicking arrow button 312. The drop-down menu 310 enables selection of a variable parameter range of the selected font. The following examples illustrate how selecting a font style or variable parameter range manipulates a visual appearance property of the diacritic marks of a text.

As shown in FIG. 3A, a text 314 is displayed in primary window 302. This text includes several words that are comprised of Arabic letters. Several letters in the text 314 have diacritic marks, such as diacritic marks 330a, 330b, appended to them. In the example of FIG. 3A, a "Large Diacritics" variable parameter is selected for the text. The selection can be based on a user input indicative of the selection or performed autonomously by the computing system in response to a trigger (for example, detection of size variance between the diacritic marks and the associated letters). In response to the selection, the visual size of the diacritic marks increases, as shown by text 316.

In FIG. 3B, a text 318 is displayed in primary window 302. In this example, a "Large Angle Tilt" variable parameter is selected for the text. The selection can be based on a user input indicative of the selection or performed autonomously by the computing system in response to a trigger. In response to the selection, the angle tilt of the diacritic marks increases, as shown by text 320. In FIG. 3C, a text 322 is displayed in primary window 302. In this example, a "Shift Lower" variable parameter is selected for the text. The selection can be based on a user input indicative of the selection or performed autonomously by the computing system in response to a trigger. In response to the selection, the position of the diacritic marks on the GUI is shifted lower, as shown by text 324.

Figure 4:
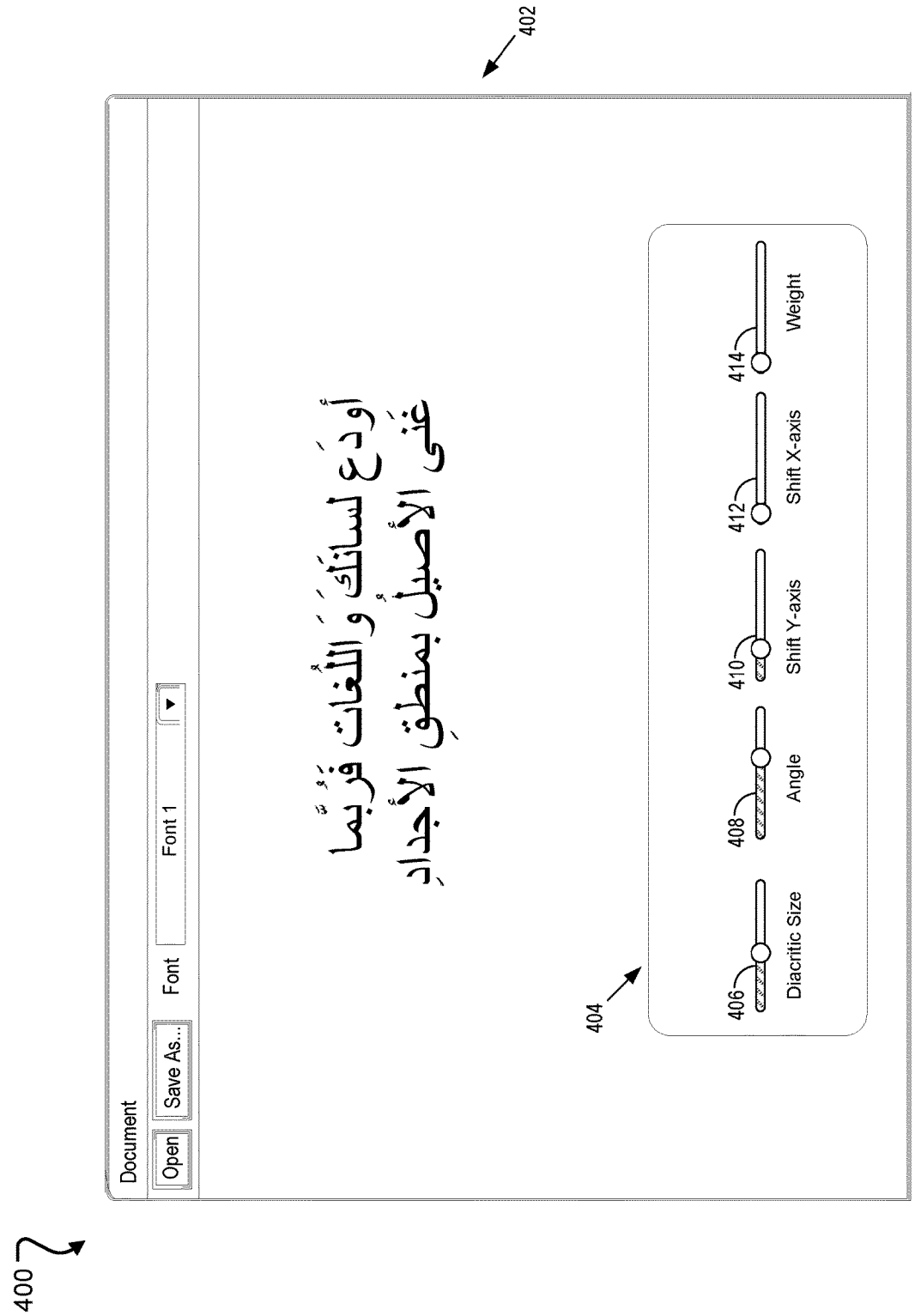
FIG. 4 illustrates an example graphical user interface (GUI) that includes a control panel for controlling the visual appearance properties of diacritic marks, according to some implementations of the present disclosure.

FIG. 4 illustrates an example graphical user interface (GUI) 400 that includes a control panel 404 for controlling visual properties of diacritic marks, according to some implementations. The GUI 400 may be associated with any software application, such as a software text editor. As shown in FIG. 4, the GUI 400 includes a primary window 402 that displays text and other software elements. Additionally, the GUI 400 includes a control panel 404. The control panel 404 includes graphical elements that allow a user to indicate the desired visual properties of the diacritic marks. As shown in FIG. 4, in one example, the graphical elements can be controllable slides 406, 408, 410, 412, 414 that enable a user to indicate a desired value for one or more visual appearance properties of the diacritic marks of a displayed text. In particular, slide 406 enables manipulation of diacritic size, slide 408 enables manipulation of the angle of diacritics, slide 410 enables manipulation of the Y-axis position of diacritics, slide 412 enables manipulation of the X-axis position of diacritics, and slide 414 enables manipulation of the weight of diacritics.

The slides 406-414 enable incremental control of the visual appearance properties of the diacritic marks. More specifically, a user can indicate a desired value of a particular visual appearance property by adjusting the position of the slide. In response, the font system determines the font style that corresponds to the to the desired value of the particular visual appearance property. The font system that selects that font style to use for the diacritics of the text.

Figure 5A:
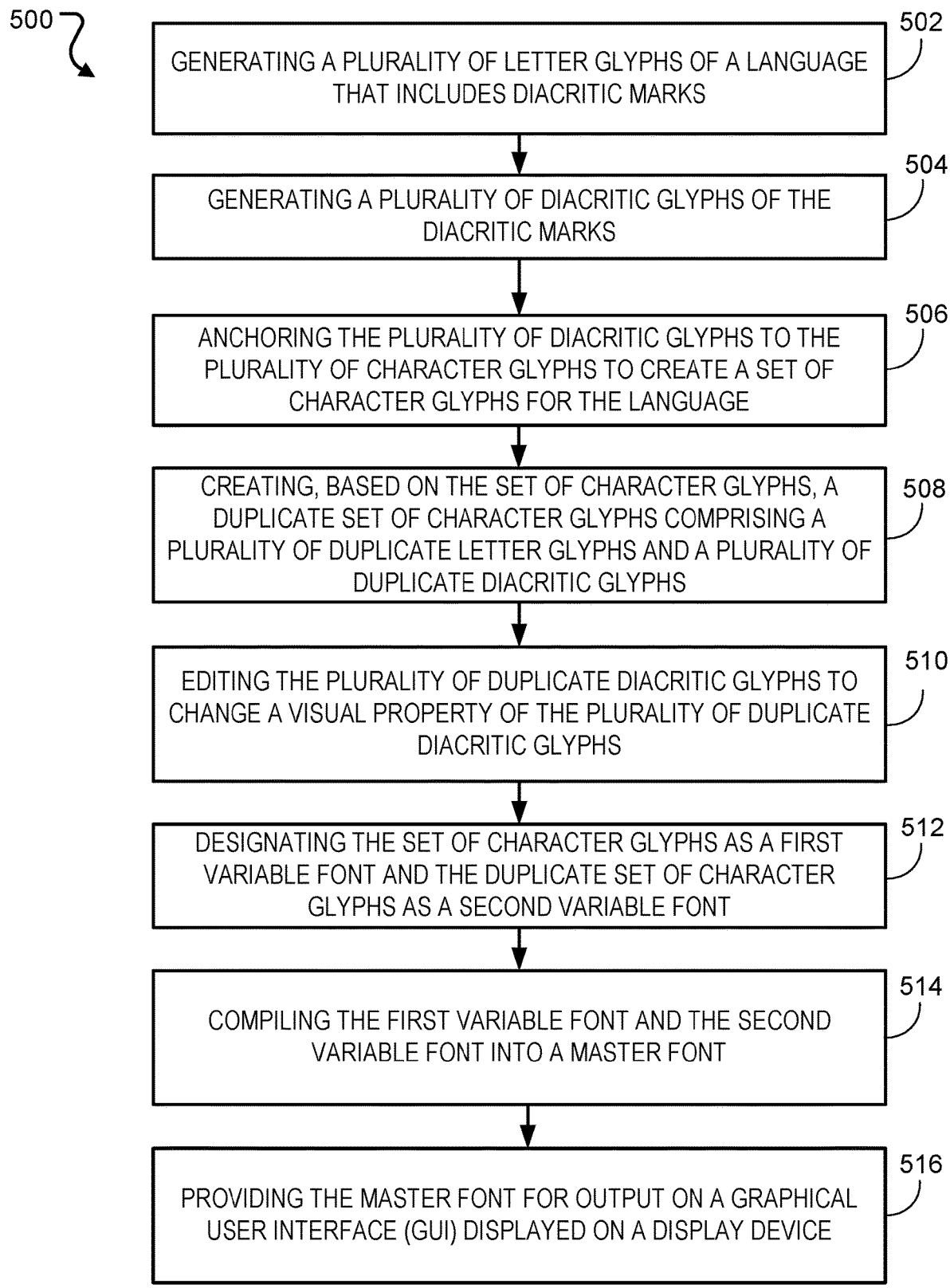
FIG. 5A illustrates a flowchart of an example method, according to some implementations of the present disclosure.

FIG. 5A is a flowchart of an example method 500, according to some implementations. The method 500 is for generating a font that enables modifying a visual property of diacritic marks. For clarity of presentation, the description that follows generally describes method 500 in the context of the other figures in this description. However, it will be understood that method 500 can be performed, for example, by any suitable system, environment, software, hardware, or a combination of systems, environments, software, and hardware, as appropriate. In some implementations, various steps of method 500 can be run in parallel, in combination, in loops, or in any order.

At 502, method 500 involves generating a plurality of letter glyphs of a language that includes diacritic marks.

At 504, method 500 involves generating a plurality of diacritic glyphs of the diacritic marks.

At 506, method 500 involves anchoring the plurality of diacritic glyphs to the plurality of character glyphs to create a set of character glyphs for the language.

At 508, method 500 involves creating, based on the set of character glyphs, a duplicate set of character glyphs comprising a plurality of duplicate letter glyphs and a plurality of duplicate diacritic glyphs.

At 510, method 500 involves editing the plurality of duplicate diacritic glyphs to change a visual property of the plurality of duplicate diacritic glyphs.

At 512, method 500 involves designating the set of character glyphs as a first variable font and the duplicate set of character glyphs as a second variable font.

At 514, method 500 involves compiling the first variable font and the second variable font into a master font.

At 516, method 500 involves providing the master font for output on a graphical user interface (GUI) displayed on a display device.

In some implementations, method 500 further involves generating a plurality of font weight styles for the master font; and providing the plurality of font weight styles for output on the GUI.

In some implementations, method 500 further involves coding respective names for each of the first variable font and the second variable font, wherein the respective name of the second variable font is based on the changed visual property.

In some implementations, the GUI includes a font menu that includes the respective names of the first variable font and the second variable font.

In some implementations, method 500 further involves receiving a user input indicating selection of one of the first variable font and the second variable font for a text that includes diacritic marks, wherein the text is displayed on the GUI.

In some implementations, editing the plurality of duplicate diacritic glyphs to change a visual property involves editing code of source files of the plurality of duplicate diacritic glyphs to change a value of the visual property.

In some implementations, the visual property is one of a visual scale, Y- or vertical-position with respect to a base letter, X- or horizontal-position with respect to the base letter, angle tilt, or weight of the plurality of duplicate diacritic glyphs.

Figure 5B:
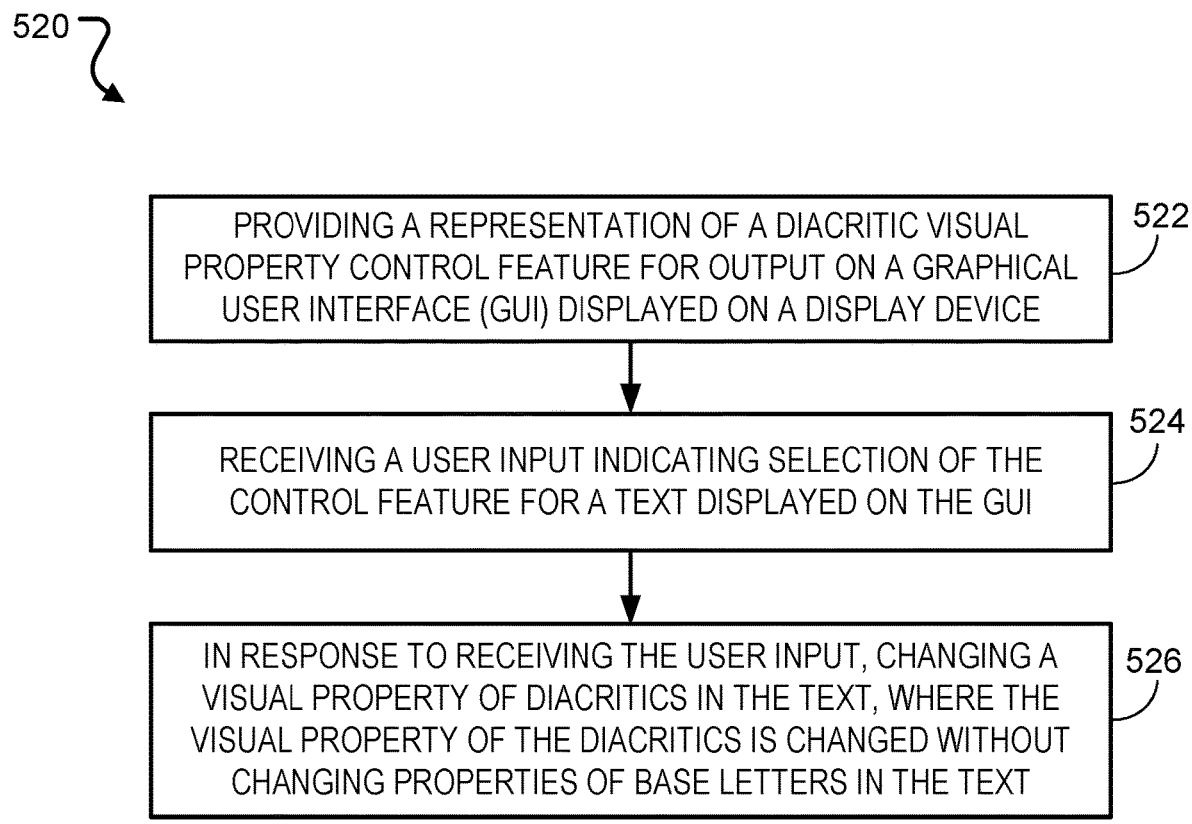
FIG. 5B illustrates a flowchart of another example method, according to some implementations of the present disclosure.

FIG. 5B is a flowchart of an example method 520, according to some implementations. For clarity of presentation, the description that follows generally describes method 520 in the context of the other figures in this description. However, it will be understood that method 520 can be performed, for example, by any suitable system, environment, software, hardware, or a combination of systems, environments, software, and hardware, as appropriate. In some implementations, various steps of method 520 can be run in parallel, in combination, in loops, or in any order.

At step 522, method 520 involves providing a representation of a diacritic visual property control feature for output on a graphical user interface (GUI) displayed on a display device.

At step 524, method 520 involves receiving a user input indicating selection of the control feature for a text displayed on the GUI.

At step 526, method 520 involves, in response to receiving the user input, changing a visual property of diacritics in the text, where the visual property of the diacritics is changed without changing properties of base letters in the text.

Figure 6:
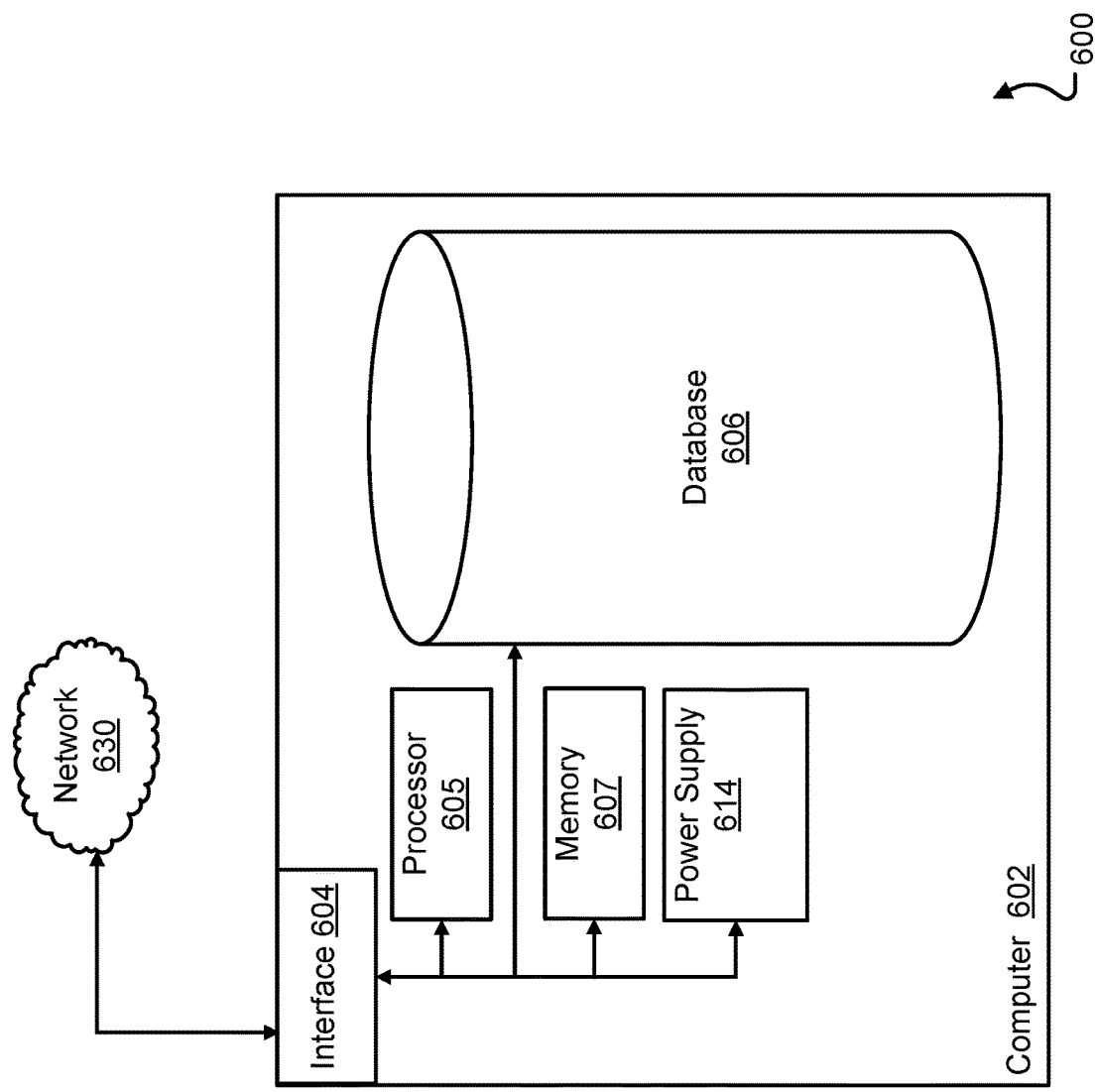
FIG. 6 illustrates a block diagram of an example computer system, according to some implementations of present disclosure.

FIG. 6 is a block diagram of an example computer system 600 that can be used to provide computational functionalities associated with described algorithms, methods, functions, processes, flows, and procedures described in the present disclosure, according to some implementations of the present disclosure. In some implementations, the font system 100 can be the computer system 600, include the computer system 600, or include part of the computer system 600. In some implementations, the font system 100 can communicate with the computer system 600.

The illustrated computer 602 is intended to encompass any computing device such as a server, a desktop computer, embedded computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI). In some implementations, the inputs and outputs include display ports (such as DVI-I+2x display ports), USB 3.0, GbE ports, isolated DI/O, SATA-III (6.0 Gb/s) ports, mPCIe slots, a combination of these, or other ports. In instances of an edge gateway, the computer 602 can include a Smart Embedded Management Agent (SEMA), such as a built-in ADLINK SEMA 2.2, and a video sync technology, such as Quick Sync Video technology supported by ADLINK MSDK+. In some examples, the computer 602 can include the MXE-5400 Series processor-based fanless embedded computer by ADLINK, though the computer 602 can take other forms or include other components.

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus. In some implementations, any or all of the components of the computer 602, including hardware or software components, can interface with each other or the interface 604 (or a combination of both), over the system bus. Interfaces can use an application programming interface (API), a service layer, or a combination of the API and service layer. The API can include specifications for routines, data structures, and object classes. The API can be either computer-language independent or dependent. The API can refer to a complete interface, a single function, or a set of APIs.

The service layer can provide software services to the computer 602 and other components (whether illustrated or not) that are communicably coupled to the computer 602. The functionality of the computer 602 can be accessible for all service consumers using this service layer. Software services, such as those provided by the service layer, can provide reusable, defined functionalities through a defined interface. For example, the interface can be software written in JAVA, C++, or a language providing data in extensible markup language (XML) format. While illustrated as an integrated component of the computer 602, in alternative implementations, the API or the service layer can be stand-alone components in relation to other components of the computer 602 and other components communicably coupled to the computer 602. Moreover, any or all parts of the API or the service layer can be implemented as child or sub-modules of another software module, enterprise application, or hardware module without departing from the scope of the present disclosure.

The computer 602 can include an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 can also include a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

An application can be an algorithmic software engine providing functionality according to particular needs, desires, or particular implementations of the computer 602 and the described functionality. For example, an application can serve as one or more components, modules, or applications. Multiple applications can be implemented on the computer 602. Each application can be internal or external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system including computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method to be performed using one or more processors, the method comprising:
    generating a plurality of letter glyphs of a language that includes diacritic marks;
    generating a plurality of diacritic glyphs of the diacritic marks;
    anchoring the plurality of diacritic glyphs to the plurality of letter glyphs to create a set of character glyphs for the language;
    creating, based on the set of character glyphs, a duplicate set of character glyphs comprising a plurality of non-editable duplicate letter glyphs and a plurality of editable duplicate diacritic glyphs;
    only editing the plurality of duplicate diacritic glyphs to change a visual property of the plurality of duplicate diacritic glyphs;
    designating the set of character glyphs as a first variable font and the duplicate set of character glyphs as a second variable font;
    compiling the first variable font and the second variable font into a master font; and
    providing the master font for output on a graphical user interface (GUI) displayed on a display device.

2. The computer-implemented method of claim 1, further comprising:
    generating a plurality of font weight styles for the master font; and
    providing the plurality of font weight styles for output on the GUI.

3. The computer-implemented method of claim 1, further comprising:
    coding respective names for each of the first variable font and the second variable font, wherein the respective name of the second variable font is based on the changed visual property.

4. The computer-implemented method of claim 3, wherein the GUI comprises:
    a font menu that includes the respective names of the first variable font and the second variable font.

5. The computer-implemented method of claim 1, the method further comprising:
    receiving a user input indicating selection of one of the first variable font and the second variable font for a text that includes diacritic marks, wherein the text is displayed on the GUI.

6. The computer-implemented method of claim 1, wherein editing the plurality of duplicate diacritic glyphs to change a visual property comprises:
    editing code of source files of the plurality of duplicate diacritic glyphs to change a value of the visual property.

7. The computer-implemented method of claim 1, wherein the visual property is one of a visual scale, Y- or vertical-position with respect to a base letter, X- or horizontal-position with respect to the base letter, angle tilt, or weight of the plurality of duplicate diacritic glyphs.

8. A non-transitory computer-readable medium storing one or more instructions executable by a computer system to perform operations comprising:
    generating a plurality of letter glyphs of a language that includes diacritic marks;
    generating a plurality of diacritic glyphs of the diacritic marks;

anchoring the plurality of diacritic glyphs to the plurality of letter glyphs to create a set of character glyphs for the language;

creating, based on the set of character glyphs, a duplicate set of character glyphs comprising a plurality of non-editable duplicate letter glyphs and a plurality of editable duplicate diacritic glyphs;

only editing the plurality of duplicate diacritic glyphs to change a visual property of the plurality of duplicate diacritic glyphs;

designating the set of character glyphs as a first variable font and the duplicate set of character glyphs as a second variable font;

compiling the first variable font and the second variable font into a master font; and providing the master font for output on a graphical user interface (GUI) displayed on a display device.

9. The non-transitory computer-readable medium of claim 8, the operations further comprising:

generating a plurality of font weight styles for the master font; and providing the plurality of font weight styles for output on the GUI.

10. The non-transitory computer-readable medium of claim 8, the operations further comprising:

coding respective names for each of the first variable font and the second variable font, wherein the respective name of the second variable font is based on the changed visual property.

11. The non-transitory computer-readable medium of claim 10, wherein the GUI comprises:

a font menu that includes the respective names of the first variable font and the second variable font.

12. The non-transitory computer-readable medium of claim 8, the operations further comprising:

receiving a user input indicating selection of one of the first variable font and the second variable font for a text that includes diacritic marks, wherein the text is displayed on the GUI.

13. The non-transitory computer-readable medium of claim 8, wherein editing the plurality of duplicate diacritic glyphs to change a visual property comprises:

editing code of source files of the plurality of duplicate diacritic glyphs to change a value of the visual property.

14. The non-transitory computer-readable medium of claim 8, wherein the visual property is one of a visual scale, Y- or vertical-position with respect to a base letter, X- or horizontal-position with respect to the base letter, angle tilt, or weight of the plurality of duplicate diacritic.

15. A system comprising:

one or more processors configured to perform operations comprising:

generating a plurality of letter glyphs of a language that includes diacritic marks;

generating a plurality of diacritic glyphs of the diacritic marks;

anchoring the plurality of diacritic glyphs to the plurality of letter glyphs to create a set of character glyphs for the language;

creating, based on the set of character glyphs, a duplicate set of character glyphs comprising a plurality of non-editable duplicate letter glyphs and a plurality of editable duplicate diacritic glyphs;

only editing the plurality of duplicate diacritic glyphs to change a visual property of the plurality of duplicate diacritic glyphs;

designating the set of character glyphs as a first variable font and the duplicate set of character glyphs as a second variable font;

compiling the first variable font and the second variable font into a master font; and providing the master font for output on a graphical user interface (GUI) displayed on a display device.

16. The system of claim 15, the operations further comprising:

generating a plurality of font weight styles for the master font; and providing the plurality of font weight styles for output on the GUI.

17. The system of claim 15, the operations further comprising:

coding respective names for each of the first variable font and the second variable font, wherein the respective name of the second variable font is based on the changed visual property.

18. The system of claim 17, wherein the GUI comprises:

a font menu that includes the respective names of the first variable font and the second variable font.

19. The system of claim 15, the operations further comprising:

receiving a user input indicating selection of one of the first variable font and the second variable font for a text that includes diacritic marks, wherein the text is displayed on the GUI.

* * * * *